(12) United States Patent
Gu

(10) Patent No.: US 11,535,376 B2
(45) Date of Patent: Dec. 27, 2022

(54) TRAFFIC INFORMATION PROCESSING EQUIPMENT, SYSTEM AND METHOD

(71) Applicant: Beijing BOE Technology Development Co., Ltd., Beijing (CN)

(72) Inventor: Yu Gu, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 200 days.

(21) Appl. No.: 16/765,674

(22) PCT Filed: Apr. 18, 2019

(86) PCT No.: PCT/CN2019/083273
§ 371 (c)(1),
(2) Date: May 20, 2020

(87) PCT Pub. No.: WO2020/211047
PCT Pub. Date: Oct. 22, 2020

(65) Prior Publication Data
US 2021/0229804 A1  Jul. 29, 2021

(51) Int. Cl.
*G08G 1/01* (2006.01)
*B64C 39/02* (2006.01)
(Continued)

(52) U.S. Cl.
CPC ............ *B64C 39/024* (2013.01); *G06V 20/17* (2022.01); *G06V 20/54* (2022.01); *G08G 1/012* (2013.01);
(Continued)

(58) Field of Classification Search
CPC ........ G06V 20/17; G06V 20/54; G08G 1/012; G08G 1/0133; G08G 1/04;
(Continued)

(56) References Cited

U.S. PATENT DOCUMENTS 10,642,279 B2 * 5/2020 Lockwood ........... G05D 1/0088
2003/0012441 A1   1/2003 Trifonov et al.
(Continued)

FOREIGN PATENT DOCUMENTS

CN    101714296 A    5/2010
CN    102768802 A    11/2012
(Continued)

OTHER PUBLICATIONS

First Chinese Office Action from Chinese Patent Application No. 201980000543.4 dated Apr. 19, 2021.

*Primary Examiner* — Andrew W Bee
(74) *Attorney, Agent, or Firm* — Dilworth & Barrese, LLP.; Michael J. Musella, Esq.

(57) ABSTRACT

A traffic information processing equipment, system and method. The traffic information processing equipment includes an image recognition and decision device and a warning device. The image recognition and decision device is configured to process a received traffic route image to identify a scene, and determine whether to perform a warning operation according to the scene to obtain a determination result. The warning device is configured to generate warning information according to the determination result for sending prompt information to vehicles in a traffic route.

14 Claims, 10 Drawing Sheets

(51) Int. Cl.
- *G08G 1/04* (2006.01)
- *G08G 1/0965* (2006.01)
- *G08G 1/0967* (2006.01)
- *G08G 5/00* (2006.01)
- *G06V 20/17* (2022.01)
- *G06V 20/54* (2022.01)

(52) U.S. Cl.
CPC ............ *G08G 1/0133* (2013.01); *G08G 1/04* (2013.01); *G08G 1/0965* (2013.01); *G08G 1/096766* (2013.01); *G08G 5/0008* (2013.01); *G08G 5/0021* (2013.01); *G08G 5/0052* (2013.01); *G08G 5/0069* (2013.01); *G08G 5/0078* (2013.01); *B64C 2201/127* (2013.01); *G06V 2201/08* (2022.01)

(58) Field of Classification Search
CPC ........... G08G 1/096766; G08G 5/0021; G08G 5/0052; G08G 5/0069; G08G 5/0078
See application file for complete search history.

(56) References Cited

U.S. PATENT DOCUMENTS

| | | | |
|---|---|---|---|
| 2017/0301234 A1* | 10/2017 | Park | G05D 1/0094 |
| 2018/0075759 A1* | 3/2018 | Kim | G08G 1/096827 |
| 2019/0051169 A1* | 2/2019 | Gomez Gutierrez | B64C 39/024 |

FOREIGN PATENT DOCUMENTS

| | | | | |
|---|---|---|---|---|
| CN | 103886609 A | 6/2014 | | |
| CN | 105740837 A | 7/2016 | | |
| CN | 207068238 U | 3/2018 | | |
| KR | 101871826 B1 * | 2/2018 | ........... | G08G 5/0004 |

* cited by examiner

TRAFFIC INFORMATION PROCESSING EQUIPMENT, SYSTEM AND METHOD

TECHNICAL FIELD

Embodiments of the present disclosure relate to a traffic information processing equipment, a traffic information processing system, and a method for processing traffic information.

BACKGROUND

With the development of urbanization, urban road networks become more and more developed, and the number of vehicles (such as cars) also increases. As a vehicle tool, cars provide convenience for people's daily travel, improve the travel efficiency, and meet the requirements of fast-paced life.

SUMMARY

At least one embodiment of the present disclosure provides a traffic information processing equipment, comprising: an image recognition and decision device, configured to process a traffic route image, which is received, to identify a scene, and determine whether to perform a warning operation according to the scene to obtain a determination result; and a warning device, configured to generate warning information according to the determination result for sending prompt information to a vehicle in a traffic route.

For example, the traffic information processing equipment provided by an embodiment of the present disclosure further comprises: a flying platform, configured to perform flying; and an image acquisition device on the flying platform, configured to acquire the traffic route image. The image recognition and decision device and the warning device are both on the flying platform.

For example, the traffic information processing equipment provided by an embodiment of the present disclosure further comprises a positioning device, and the positioning device is on the flying platform and is configured to obtain position information of the flying platform.

For example, the traffic information processing equipment provided by an embodiment of the present disclosure further comprises: a communication device on the flying platform, configured to communicate with a target vehicle to obtain position information and speed information of the target vehicle; and a speed calculation device on the flying platform, configured to adjust a distance between the flying platform and the target vehicle by controlling a speed of the flying platform.

For example, in the traffic information processing equipment provided by an embodiment of the present disclosure, processing the traffic route image, which is received, to identify the scene and determining whether to perform the warning operation according to the scene to obtain the determination result comprises: determining whether the scene is a highway, according to whether the flying platform flies above the highway while acquiring the image of the traffic route image.

For example, in the traffic information processing equipment provided by an embodiment of the present disclosure, processing the traffic route image, which is received, to identify the scene and determining whether to perform the warning operation according to the scene to obtain the determination result further comprises: obtaining a position of an emergency lane of the highway in the traffic route image in a case where the scene is the highway; performing a vehicle detection according to the position of the emergency lane in the traffic route image; determining whether there is a vehicle in the emergency lane; and determining to perform the warning operation in a case where the vehicle is in the emergency lane.

For example, in the traffic information processing equipment provided by an embodiment of the present disclosure, processing the traffic route image, which is received, to identify the scene and determining whether to perform the warning operation according to the scene to obtain the determination result further comprises: performing a vehicle detection on the traffic route image, in a case where the scene is not the highway; determining whether a number of vehicles in the traffic route image is greater than or equal to a threshold number; calculating an average speed of the vehicles, in a case where the number of the vehicles in the traffic route image is greater than or equal to the threshold number; determining whether the average speed is less than a threshold speed; and determining to perform the warning operation in a case where the average speed is less than the threshold speed.

For example, in the traffic information processing equipment provided by an embodiment of the present disclosure, the flying platform comprises: a flight control device, configured to control a flying status of the flying platform; a data link device, configured to transmit a remote control instruction and feedback data; a launch recovery device, configured to control a take-off process and a landing process of the flying platform; and a power supply, configured to provide electrical energy. The flight control device, the data link device, the launch recovery device, and the power supply are all on the airframe.

For example, in the traffic information processing equipment provided by an embodiment of the present disclosure, the warning device comprises a loudspeaker, an alarm bell or a cell broadcast system.

For example, in the traffic information processing equipment provided by an embodiment of the present disclosure, the target vehicle comprises a police car, a fire truck, an engineering rescue vehicle, or an ambulance.

For example, the traffic information processing equipment provided by an embodiment of the present disclosure further comprises a signal transmission device, and the signal transmission device is configured to receive the traffic route image.

At least one embodiment of the present disclosure provides a traffic information processing system, comprising: an image recognition and decision device, configured to process an traffic route image, which is received, to identify a scene, and determine whether to perform a warning operation according to the scene to obtain a determination result; a flying platform, configured to perform flying; and a warning device on the flying platform, configured to generate warning information according to the determination result for sending prompt information to a vehicle in the traffic route.

For example, the traffic information processing system provided by an embodiment of the present disclosure further comprises a signal transmission device. The signal transmission device is configured to the signal transmission device is configured to receive the traffic route image and transmit the determination result to the warning device; and the image recognition and decision device and the signal transmission device are outside the flying platform.

At least one embodiment of the present disclosure provides a method for processing traffic information, and the method comprises: processing an traffic route image, which is received, to identify a scene, and determining whether to perform a warning operation according to the scene to obtain a determination result; and generating warning information according to the determination result for sending prompt information to a vehicle in the traffic route.

For example, in the method provided by an embodiment of the present disclosure, processing the traffic route image, which is received, to identify the scene and determining whether to perform the warning operation according to the scene to obtain the determination result comprises: determining whether the scene is a highway to obtain a judgment result, processing the traffic route image according to the judgment result, and determining whether to perform the warning operation to obtain the determination result.

For example, in the method provided by an embodiment of the present disclosure, determining whether the scene is the highway to obtain the judgment result, processing the traffic route image according to the judgment result, and determining whether to perform the warning operation to obtain the determination result comprises: obtaining a position of an emergency lane of the highway in the traffic route image in a case where the scene is the highway; performing a vehicle detection according to the position of the emergency lane in the traffic route image; determining whether there is a vehicle in the emergency lane; and determining to perform the warning operation in a case where the vehicle is in the emergency lane.

For example, in the method provided by an embodiment of the present disclosure, obtaining the position of the emergency lane of the highway in the traffic route image comprises: extracting gradient features of the traffic route image to obtain a gradient image; acquiring a local threshold of each pixel in the gradient image; acquiring a binary image; calculating a cumulative sum of each column of white pixels in the binary image; obtaining a peak position of the cumulative sum; performing straight line fitting in a neighborhood of the peak position of the cumulative sum in the binary image; selecting a plurality of straight lines that meet an angle requirement; calculating a number of white pixels in a neighborhood of two straight lines that are adjacent and at an edge of the binary image among the plurality of straight lines; determining whether the two straight lines are solid lines according to the number of the white pixels; and determining that an area between the two straight lines is the position of the emergency lane in a case where the two straight lines are the solid lines.

For example, in the method provided by an embodiment of the present disclosure, determining whether the scene is the highway to obtain the judgment result, processing the traffic route image according to the judgment result, and determining whether to perform the warning operation to obtain the determination result comprises: performing a vehicle detection on the traffic route image in a case where the scene is not the highway; determining whether a number of vehicles in the traffic route image is greater than or equal to a threshold number; in a case where the number of the vehicles in the traffic route image is greater than or equal to the threshold number, calculating an average speed of the vehicles; determining whether the average speed is less than a threshold speed; and determining to perform the warning operation in a case where the average speed is less than the threshold speed.

For example, in the method provided by an embodiment of the present disclosure, calculating the average speed of the vehicles comprises: obtaining an actual distance represented by each pixel in the traffic route image according to a width of each of the vehicles in the traffic route image; calculating a pixel displacement of each of the vehicles in two adjacent frames of the traffic route image; obtaining a speed of each of the vehicles according to the actual distance represented by each pixel in the traffic route image, the pixel displacement of each of the vehicles in the two adjacent frames of the traffic route image, and a time interval between the two adjacent frames of the traffic route image; and calculating an average value of speeds of all the vehicles in the traffic route image to obtain the average speed.

For example, the method provided by an embodiment of the present disclosure further comprises: obtaining the traffic route image from a flying platform.

For example, the method provided by an embodiment of the present disclosure further comprises: obtaining position information and speed information of a target vehicle; controlling speed of a flying platform to adjust a distance between the flying platform and the target vehicle.

For example, in the method provided by an embodiment of the present disclosure, controlling the speed of the flying platform to adjust the distance between the flying platform and the target vehicle comprises: calculating an initial distance between the flying platform and the target vehicle according to position information of the flying platform and the position information of the target vehicle; calculating a predetermined distance between the flying platform and the target vehicle according to the speed information of the target vehicle and a predetermined dispersion time; and controlling the speed of the flying platform to adjust the distance between the flying platform and the target vehicle according to a comparison result of the initial distance and the predetermined distance.

BRIEF DESCRIPTION OF THE DRAWINGS

In order to clearly illustrate the technical solution of the embodiments of the present disclosure, the drawings of the embodiments will be briefly described in the following. It is obvious that the described drawings in the following are only related to some embodiments of the present disclosure and thus are not limitative of the present disclosure.

DETAILED DESCRIPTION

Figure 1:
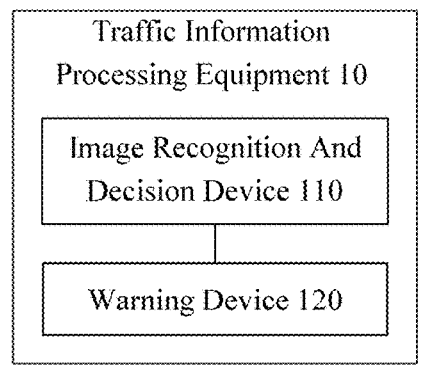
FIG. 1 is a schematic block diagram of a traffic information processing equipment provided by at least one embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", "coupled", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

With the increasing number of vehicles, road congestion is getting worse. For example, road congestion is much serious during peak travel time (such as the morning rush hour or the evening rush hour) or when traffic emergencies occur. Some special vehicles, such as police cars, fire trucks, engineering rescue vehicles, and ambulances, usually need to pass quickly to reach the mission site as soon as possible, thereby minimizing people's lives and property loss. However, because frequent traffic jams frequently happen, and there may be some drivers who do not follow the traffic rules and drive in the emergency lane, when the special vehicles need to perform emergency tasks, it is difficult for the special vehicles to quickly reach the mission site, which may cause serious losses. How to enable the special vehicles to reach the mission site faster becomes very important. For example, the congestion prompts built in the electronic map can help the special vehicles to avoid congested road sections, but there may be certain lag and inaccuracy, and may cause the special vehicles to travel along longer distances. Therefore, the effect to shorten the time for the vehicles to reach the mission site is limited.

At least one embodiment of the present disclosure provides a traffic information processing equipment, system and method. The traffic information processing equipment can provide guidance and warning for vehicles in a traffic route (such as cars on a road), so as to help, for example, police cars, fire trucks, engineering rescue vehicles, ambulances and other special vehicles, to pass quickly, which has real-time capability and accuracy, and can ensure the dispersing effectiveness of the section, so as to avoid affecting the traffic due to dispersion too long time ahead or obstructing the passage of the special vehicles due to untimely dispersion.

Hereinafter, the embodiments of the present disclosure are described in detail with reference to the accompanying drawings. It should be noted that the same reference numerals in different drawings are used to refer to the same described components or elements.

At least one embodiment of the present disclosure provides a traffic information processing equipment. The traffic information processing equipment comprises an image recognition and decision device and a warning device. The image recognition and decision device is configured to process a received traffic route image to identify a scene, and determine whether to perform a warning operation according to the scene to obtain a determination result. The warning device is configured to generate warning information according to the determination result for sending prompt information to vehicles in a traffic route.

FIG. 1 is a schematic block diagram of a traffic information processing equipment provided by at least one embodiment of the present disclosure. As illustrated in FIG. 1, a traffic information processing equipment 10 comprises an image recognition and decision device 110 and a warning device 120.

The image recognition and decision device 110 is configured to process a received traffic route image to identify a scene, and determine whether to perform a warning operation according to the scene to obtain a determination result. For example, the traffic route image may be captured by an image acquisition device which is separately provided or which is provided in the traffic information processing equipment 10 and can transmit the traffic route image to the image recognition and decision device 110. For example, in the case where the traffic route image is an image of a highway, the image recognition and decision device 110 can obtain the position of the emergency lane in the traffic route image and perform a vehicle detection (such as a car detection), so as to determine whether a vehicle is driving in the emergency lane, and if yes, it is determined to perform a warning operation. For example, in the case where the traffic route image is an image of a non-highway (such as an urban road), the image recognition and decision device 110 can perform the vehicle detection (such as the car detection) on the traffic route image and obtain the number of vehicles in the traffic route image. In the case where the number of vehicles is greater than or equal to a preset threshold number, the image recognition and decision device 110 calculates the average speed of the vehicles and determine whether the average speed of the vehicles is less than a preset threshold speed, and if so, it is determined to perform a warning operation.

The warning device 120 is configured to generate warning information according to the determination result for sending prompt information to vehicles in a traffic route. Here, the "determination result" refers to a judgment result obtained by the image recognition and decision device 110, and for example, the judgment result is to perform a warning operation. The "warning information" refers to control information which can control the warning device 120 itself or a separately provided device to send out the prompt information. The vehicle in the traffic route is, for example, a car traveling on the road. For example, the warning device 120 may include a loudspeaker, an alarm bell, or a cell broadcast system. Correspondingly, the warning information is, for example, control information for controlling the loudspeaker, the alarm bell, or the cell broadcast system. The prompt information is, for example, a prompt sound or a warning sound which can be played, or text messages (such as short messages) which are sent to the driver's mobile phone through the cell broadcast system. Of course, the embodiments of the present disclosure are not limited thereto, and the warning device 120 may include any applicable component that can generate warning information, such as an FM broadcast device, etc. Accordingly, the prompt information may be any form of information, such as broadcast messages that can be received through a radio receiver of the vehicle.

In the case where there is a vehicle driving in the emergency lane of the highway, the warning device 120 may generate the warning information for sending the prompt information. After receiving the prompt information, the driver of the vehicle driving in the emergency lane can leave the emergency lane, thereby providing convenience for special vehicles such as police vehicles, fire trucks, engineering rescue vehicles, ambulances, etc. to quickly pass through the emergency lane. In the case where a congestion occurs on a non-highway, the warning device 120 may also generate the warning information for sending the prompt information. After receiving the prompt information, the driver of the vehicle on the road can evade and evacuate, so as to provide traffic lanes for the special vehicles such as police vehicles, fire trucks, engineering rescue vehicles, ambulances, etc., and to allow them to pass quickly. In at least one embodiment of the present disclosure, the traffic information processing equipment 10 can intelligently identify the emergency lane in the highway based on visual recognition technology, determine congested sections of the urban roads, and provide guidance and warning for the vehicles in the traffic route (such as cars on the road) according to different road conditions, so as to help the special vehicles such as police cars, fire trucks, engineering rescue vehicles, and ambulances to pass quickly to reach the mission site as soon as possible, which has real-time capability and accuracy.

It should be noted that in some embodiments of the present disclosure, the traffic information processing equipment 10 can not only provide guidance and warning for the vehicles on the road, but also provide guidance and warning for ships on the river. The type of the traffic route and the type of the vehicle are not limited in the embodiments of the present disclosure.

Figure 2:
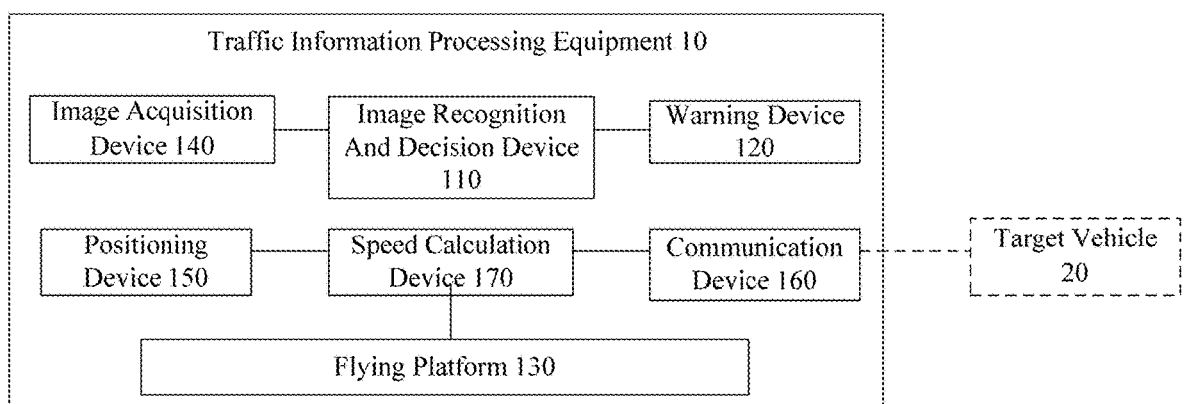
FIG. 2 is a schematic block diagram of another traffic information processing equipment provided by at least one embodiment of the present disclosure.

FIG. 2 is a schematic block diagram of another traffic information processing equipment provided by at least one embodiment of the present disclosure. As illustrated in FIG. 2, the traffic information processing equipment 10 may further comprise a flying platform 130, an image acquisition device 140, and a positioning device 150.

For example, the flying platform 130 is configured to perform flying, for example, flying above a traffic route (e.g., above a road) according to a preset route. For example, the preset route may be set before the flying platform 130 takes off, or may be set or transmitted to the flying platform 130 in real time during the flight of the flying platform 130, which is not limited in the embodiments of the present disclosure. For example, the flying platform 130 may be a rotary-wing unmanned aerial vehicle, a fixed-wing unmanned aerial vehicle, or a flapping-wing unmanned aerial vehicle, etc., and for example, may be a general four-rotor unmanned aerial vehicle, a six-rotor unmanned aerial vehicle, etc, which is not limited in the embodiments of the present disclosure. In the case where the flying platform 130 is a rotary-wing unmanned aerial vehicle, the controllability of the flying platform 130 is strong, the flying platform 130 can take off and land vertically and can hover, and the flying platform 130 is applicable for low-altitude and low-speed flight, and can better meet the needs of traffic dispersion.

For example, the image acquisition device 140 is on the flying platform 130 and is configured to acquire the traffic route image. For example, the image acquisition device 140 may be a down-view camera, such as a digital high-definition camera, and the shooting angle of the down-view camera is adjustable. For example, the traffic information processing equipment 10 may further include a storage device to temporarily or permanently store the image data acquired by the image acquisition device 140. In the case where the flying platform 130 flies above the road, the image acquisition device 140 provided on the flying platform 130 can take a traffic route image (i.e., an image of the road) and transmit the traffic route image to the image recognition and decision device 110. For example, the image acquisition device 140 can be directly installed on the flying platform 130, or can be installed on the flying platform 130 through a cradle head, or can be installed in other ways, which is not limited by the embodiments of the present disclosure. In the case where the image acquisition device 140 is installed by using the cradle head, the image stabilization effect can be achieved, so as to avoid the image acquisition device 140 being affected by factors such as the vibration of the flying platform 130 and the disturbance of the airflow, so that the traffic route image captured by the image acquisition device 140 is clearer, thereby helping to improve the accuracy of subsequent processing by the image recognition and decision device 110.

For example, the positioning device 150 is on the flying platform 130 and is configured to obtain position information of the flying platform 130. For example, the positioning device 150 may be a global positioning system (GPS) positioning device, a Beidou system positioning device, or the like. For example, in the case where the flying platform 130 flies above the road, the image acquisition device 140 performs shooting, and whether the flying platform 130 is flying above a highway is determined according to the position information obtained by the positioning device 150 at the time of shooting, thereby determining whether the scene of the traffic route image that is captured is a highway. For example, the positioning device 150 may be also configured to navigate the flying platform 130, so that the flying platform 130 flies according to a preset route.

The working modes of the image recognition and decision device 110 and the warning device 120 can be referred to the description of FIG. 1 and are not repeated herein. For example, the image recognition and decision device 110 and the warning device 120 are both installed on the flying platform 130. In this way, both the signal transmission between the image recognition and decision device 110 and the image acquisition device 140 and the signal transmission between the image recognition and decision device 110 and the warning device 120 are faster, which helps to improve the real-time performance and the effectiveness of the traffic information processing equipment 10. In addition, because the warning device 120 is provided on the flying platform 130 and can fly above the road together with the flying platform 130, the warning device 120 can be set as a loudspeaker or an alarm bell, etc., to play a prompt sound or a warning sound, which has intuition, real-time performance and other advantages, and can reduce costs.

For example, in some embodiments of the present disclosure, the traffic information processing equipment 10 may further include a communication device 160 and a speed calculation device 170.

For example, the communication device 160 is provided on the flying platform 130 and is configured to communicate with a target vehicle 20 to obtain position information and speed information of the target vehicle 20. For example, the communication device 160 may be a Bluetooth communication device, a wireless local area network (WIFI) communication device based on the IEEE 802.11b standard, a 5G/4G/3G communication device, an infrared communication device, etc., which is not limited by the embodiments of the present disclosure. For example, the target vehicle 20 is a special vehicle such as a police car, a fire truck, an engineering rescue vehicle, or an ambulance. The target vehicle 20 travels behind the flying platform 130. The target vehicle 20 transmits position information and speed information to the communication device 160 based on the corresponding communication protocol. For example, the target vehicle 20 is also correspondingly provided with a communication component to facilitate communication with the communication device 160.

For example, the speed calculation device 170 is provided on the flying platform 130 and is configured to adjust the distance between the flying platform 130 and the target vehicle 20 by controlling the speed of the flying platform 130. For example, the communication device 160 transmits the received position information and speed information of the target vehicle 20 to the speed calculation device 170, and the positioning device 150 also transmits the position information of the flying platform 130 to the speed calculation device 170. The speed calculation device 170 controls the speed of the flying platform 130 according to the information, thereby adjusting the distance between the flying platform 130 and the target vehicle 20, so that the distance between the two is not too large or too small.

In this way, the distance between the flying platform 130 and the target vehicle 20 can be kept within a suitable range, so that the dispersing effectiveness of the section can be ensured, thereby avoiding affecting the traffic due to dispersion a too long time ahead or obstructing the passage of the special vehicles due to untimely dispersion.

Figure 3:
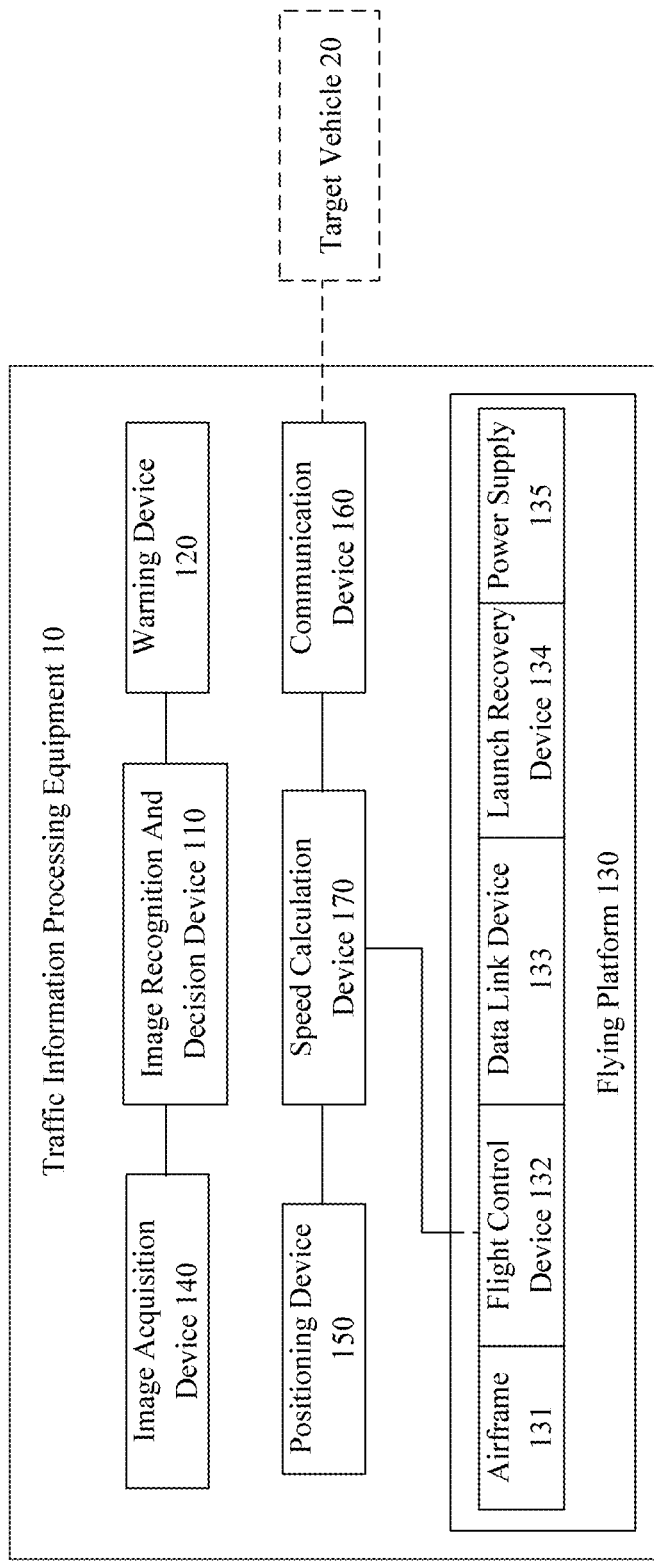
FIG. 3 is a schematic block diagram of still another traffic information processing equipment provided by at least one embodiment of the present disclosure.

FIG. 3 is a schematic block diagram of another traffic information processing equipment provided by at least one embodiment of the present disclosure. As illustrated in FIG. 3, in the traffic information processing equipment 10, the flying platform 130 includes an airframe 131, a flight control device 132, a data link device 133, a launch recovery device 134, and a power supply 135, and other devices in the traffic information processing equipment 10 are basically the same as the devices in the traffic information processing equipment 10 illustrated in FIG. 2.

For example, the airframe 131 provides a rigid support structure for the flying platform 130 for mounting various components. For example, the airframe 131 may be made of composite materials, such as carbon fiber composite materials, glass fiber composite materials, honeycomb sandwich composite materials, etc., or may also be made of metals, plastics, etc., which is not limited in the embodiments of the present disclosure.

For example, the flight control device 132 is configured to control the flying status of the flying platform 130. The flight control device 132 has an important influence on the stability and flight performance of the flying platform 130, and also has an important influence on the reliability, accuracy, and real-time performance in data transmission of the flying platform 130. The data link device 133 is configured to transmit a remote control instruction and feedback data. The launch recovery device 134 is configured to control a take-off process and a landing process of the flying platform 130. For example, the launch recovery device 134 can smoothly lift the flying platform 130 to a safe altitude and speed, and safely fall back from the sky to the ground after performing the mission. The power supply 135 is configured to provide electrical energy. For example, the flight control device 132, the data link device 133, the launch recovery device 134, and the power supply 135 are all provided on the airframe 131. For detailed descriptions of the flight control device 132, the data link device 133, the launch recovery device 134, and the power supply 135, reference may be made to a conventional design, for example, of corresponding devices in a conventional unmanned aerial vehicle, which are not described in detail here. It should be noted that in some embodiments of the present disclosure, the flying platform 130 may further include more devices, such as a landing gear, a motor, a rotor, etc., which may be determined according to actual needs, which is not limited in the embodiments of the present disclosure.

For example, in some embodiments, in the case where the traffic information processing equipment 10 includes the communication device 160 and the speed calculation device 170, the speed calculation device 170 transmits the calculated speed parameter to the flight control device 132 of the flying platform 130, so that the flight control device 132 can control the speed of the flying platform 130 according to the speed parameter.

It should be noted that, in the embodiments of the present disclosure, the image recognition and decision device 110, the warning device 120, and the speed calculation device 170 may be hardware, software, firmware, and any feasible combination thereof. For example, the image recognition and decision device 110, the warning device 120, and the speed calculation device 170 may be dedicated or general-purpose circuits, chips, or devices, or a combination of a processor and a memory. For example, the processor may be a central processor unit (CPU), a digital signal processor (DSP), etc., and the memory can be any type of memory (such as a flash memory, etc.), which stores computer-executable codes for implementing the image recognition and decision function, the warning information generation function, the speed calculation function, etc., as well as data required to execute the computer-executable codes and generated data. For example, the image recognition and decision device 110, the warning device 120, and the speed calculation device 170 may be separate devices from each other, or may be integrated into the same device. The embodiments of the present disclosure do not limit the specific implementation forms of the image recognition and decision device 110, the warning device 120, and the speed calculation device 170.

Figure 4:
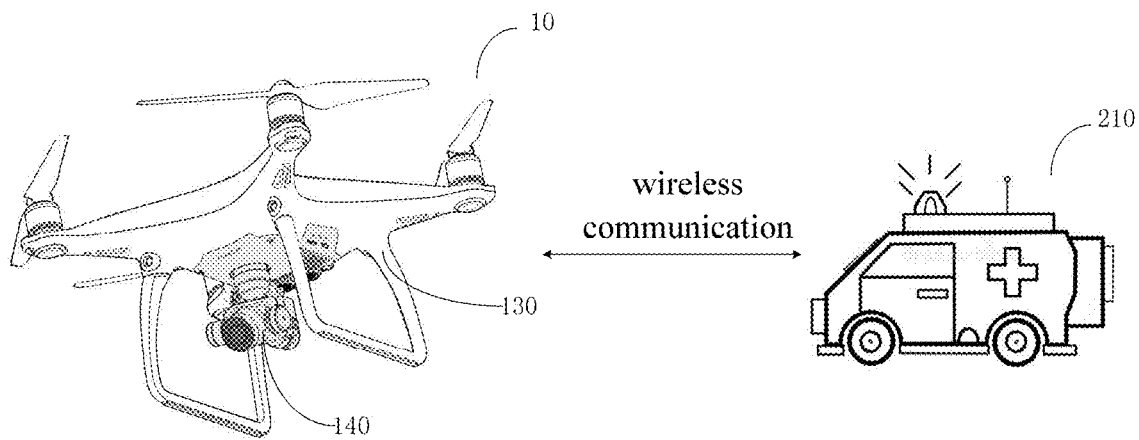
FIG. 4 is a schematic diagram of an application scenario of a traffic information processing equipment provided by at least one embodiment of the present disclosure.

FIG. 4 is a schematic diagram of an application scenario of a traffic information processing equipment provided by at least one embodiment of the present disclosure. As illustrated in FIG. 4, each device in the traffic information processing equipment 10 (such as the image recognition and decision device 110, the warning device 120, the image acquisition device 140, the positioning device 150, the communication device 160, the speed calculation device 170, etc., which are not all illustrated in the figure) are provided on the flying platform 130, and the flying platform 130 is for example, a four-rotor unmanned aerial vehicle. For example, the target vehicle 20 is an ambulance 210.

When the traffic information processing equipment 10 is used for traffic dispersion, the flying platform 130 flies above the road and keeps flying in front of the ambulance 210. The image acquisition device 140 takes a picture, obtains a traffic route image, and transmits the traffic route image to the image recognition and decision device 110. The image recognition and decision device 110 determines whether the flying platform 130 is flying above the highway at this time according to the position information obtained by the positioning device 150 at the time of shooting, thereby determining whether the scene of the captured traffic route image is a highway. In the case where the traffic route image is an image of the highway, the image recognition and decision device 110 determines whether a vehicle is driving in the emergency lane based on the traffic route image, and if so, it is determined to perform a warning operation. In the case where the traffic route image is an image of non-highway (such as an urban road), the image recognition and decision device 110 calculates the number of vehicles in the traffic route image, further calculates the average speed of the vehicles, and determines whether the average speed of the vehicles is less than a preset threshold speed, and if so, it is determined to perform a warning operation.

The warning device 120 receives the determination result of the image recognition and decision device 110, and in the case where the determination result indicates that the warning operation needs to be performed, the warning device 120 generates warning information for sending prompt information to vehicles on the road. For example, the warning device 120 may be a loudspeaker, an alarm bell, or a cell broadcast system installed on the flying platform 130. Therefore, the warning information may be a control signal for the loudspeaker, the alarm bell or the cell broadcast system, etc., so as to play a prompt sound or a warning sound for the vehicles on the road, or send text messages (such as short messages) to the driver's mobile phone through the cell broadcast system. After receiving the prompt information, the drivers of the vehicles on the road can perform avoidance, for example, driving from the emergency lane of the highway to the non-emergency lane to keep the emergency lane clear, or changing the lane on the urban road to leave a clear lane, so as to facilitate rapid passage of the ambulance 210 which drives behind the flying platform 130.

The communication device 160 may perform wireless communication with the ambulance 210 to obtain the position information and the speed information of the ambulance 210, and transmit the position information and the speed information to the speed calculation device 170. The positioning device 150 also transmits the position information of the flying platform 130 to the speed calculation device 170. The speed calculation device 170 controls the speed of the flying platform 130 according to the information, thereby adjusting the distance between the flying platform 130 and the ambulance 210, so that the distance between the two is not too large or too small, so as to ensure the dispersing effectiveness of the section.

In this embodiment, each device in the traffic information processing equipment 10 is provided on the flying platform 130, which can simplify the signal transmission method among the devices, improve the signal transmission efficiency, and improve the integration of the traffic information processing equipment 10 for easy maintenance and management.

Figure 5:
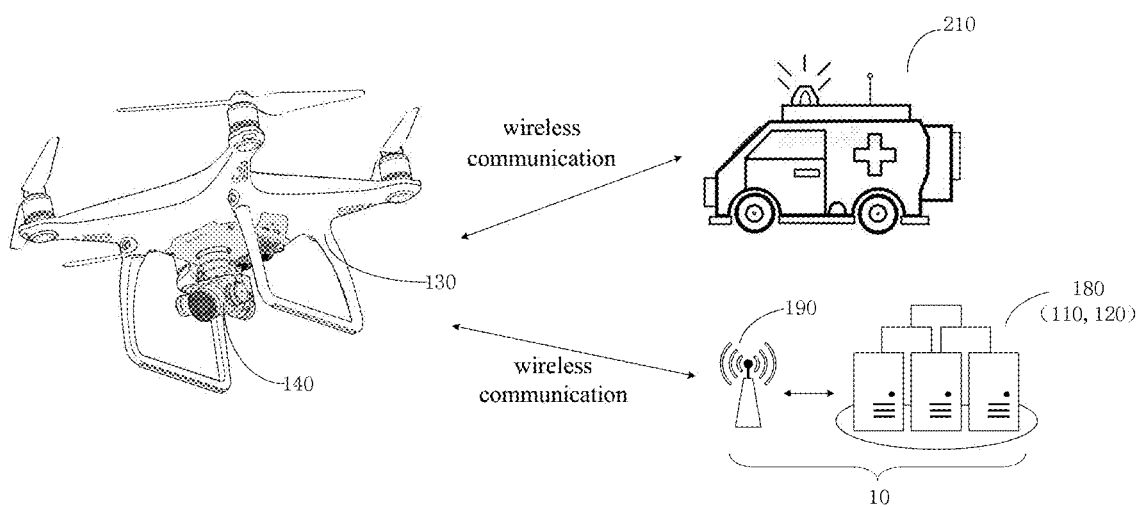
FIG. 5 is a schematic diagram of an application scenario of another traffic information processing equipment provided by at least one embodiment of the present disclosure.

FIG. 5 is a schematic diagram of an application scenario of another traffic information processing equipment provided by at least one embodiment of the present disclosure. As illustrated in FIG. 5, the traffic information processing equipment 10 includes an image recognition and decision device 110, a warning device 120, and a signal transmission device 190. The image recognition and decision device 110 and the warning device 120 are in a separately provided service base station 180. The signal transmission device 190 is, for example, a wireless communication device provided on the ground and configured to receive the traffic route image. For example, the traffic information processing equipment 10 needs to cooperate with a separately provided flying platform, such as the aforementioned flying platform 130, and the flying platform 130 is provided with the image acquisition device 140, the positioning device 150, the communication device 160, and the speed calculation device 170 (which are not all illustrated in the figure). For example, the flying platform 130 is a four-rotor unmanned aerial vehicle, and the target vehicle 20 is an ambulance 210.

When the traffic information processing equipment 10 is used for traffic dispersion, the flying platform 130 cooperating with the traffic information processing equipment 10 flies above the road and keeps flying in front of the ambulance 210. The image acquisition device 140 shoots and obtains the traffic route image, and then transmits the traffic route image to the signal transmission device 190 through wireless communication. The signal transmission device 190 transmits the received traffic route image to the image recognition and decision device 110 provided in the service base station 180. In addition, the position information obtained by the positioning device 150 at the time of shooting is also transmitted to the signal transmission device 190 through wireless communication, and further transmitted to the image recognition and decision device 110. The image recognition and decision device 110 determines whether the scene of the captured traffic route image is a highway, and further determines whether to perform a warning operation. The specific determination method can be referred to the above description, which is not repeated here.

The warning device 120 receives the determination result of the image recognition and decision device 110. In the case where the determination result indicates that a warning operation needs to be performed, the warning device 120 generates the warning information, for example, the control information. In this case, the warning device 120 does not directly send the prompt information to the vehicles on the road, but controls the device provided separately to send the prompt information to the vehicles on the road according to the warning information. For example, the warning device 120 wirelessly transmits the warning information to the loudspeaker, alarm bell, or cell broadcast system provided on the flying platform 130 through the signal transmission device 190. Under control of the warning information, the loudspeaker, alarm bell, or cell broadcast system sends out the prompt information to the vehicles on the road, for example, playing a prompt sound or a warning sound for the vehicles on the road, or sending text messages (such as short messages) to the driver's mobile phone through the cell broadcast system. After receiving the prompt information, the drivers of the vehicles on the road can perform avoidance, so as to facilitate rapid passage of the ambulance 210 which drives behind the flying platform 130.

The communication device 160 provided on the flying platform 130 can communicate with the ambulance 210 wirelessly and cooperate with the speed calculation device 170 to adjust the distance between the flying platform 130 and the ambulance 210. For the specific working mode, reference can be made to the above, which is not described again here.

In this embodiment, the image recognition and decision device 110 and the warning device 120 are both in the service base station 180, and for example, the service base station 180 is located in the ground control center, so that it is convenient for the staffs to coordinate and monitor comprehensively to simultaneously perform traffic dispersion for a plurality of target traffic vehicles 20, and various types of flying platforms can be flexibly accessed, thereby improving the compatibility of the traffic information processing equipment 10.

Figure 6:
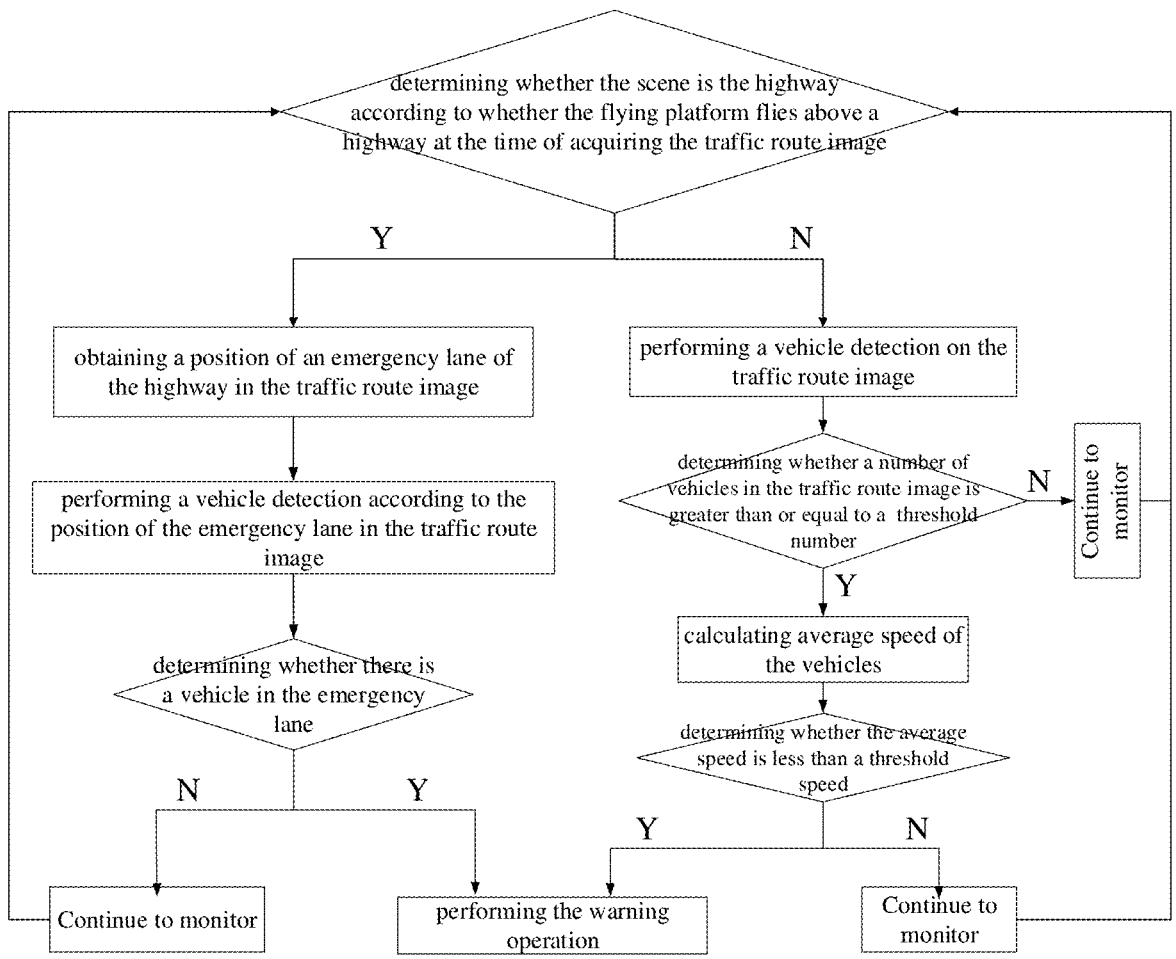
FIG. 6 is a schematic working flow chart of a traffic information processing equipment provided by at least one embodiment of the present disclosure.
Figure 7:
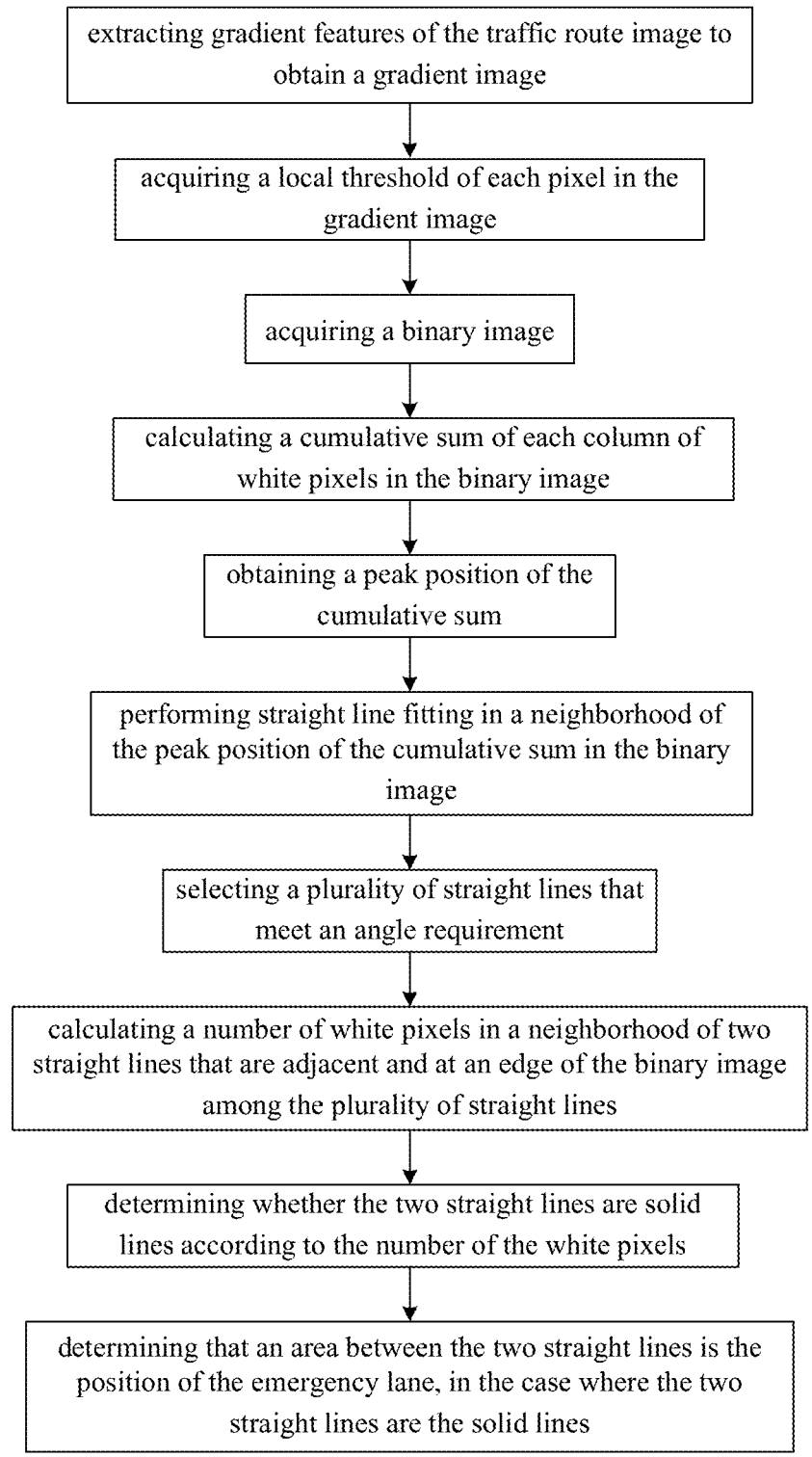
FIG. 7 is a schematic flow chart of obtaining a position of an emergency lane performed by a traffic information processing equipment provided by at least one embodiment of the present disclosure.
Figure 8:
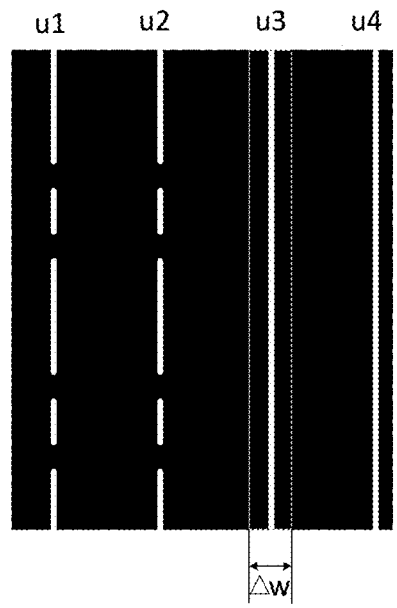
FIG. 8 is a schematic diagram of a straight line fitting performed by a traffic information processing equipment provided by at least one embodiment of the present disclosure.
Figure 9:
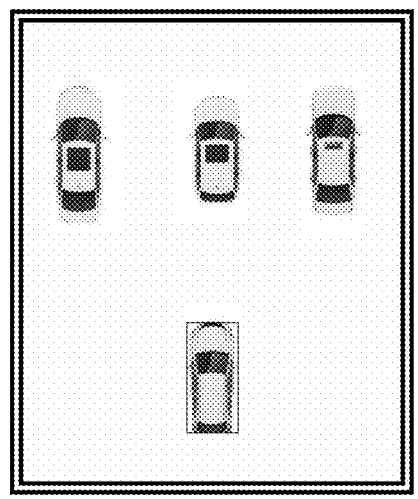
FIG. 9 is a schematic diagram of an image of an traffic route captured by a traffic information processing equipment provided by at least one embodiment of the present disclosure.
Figure 10:
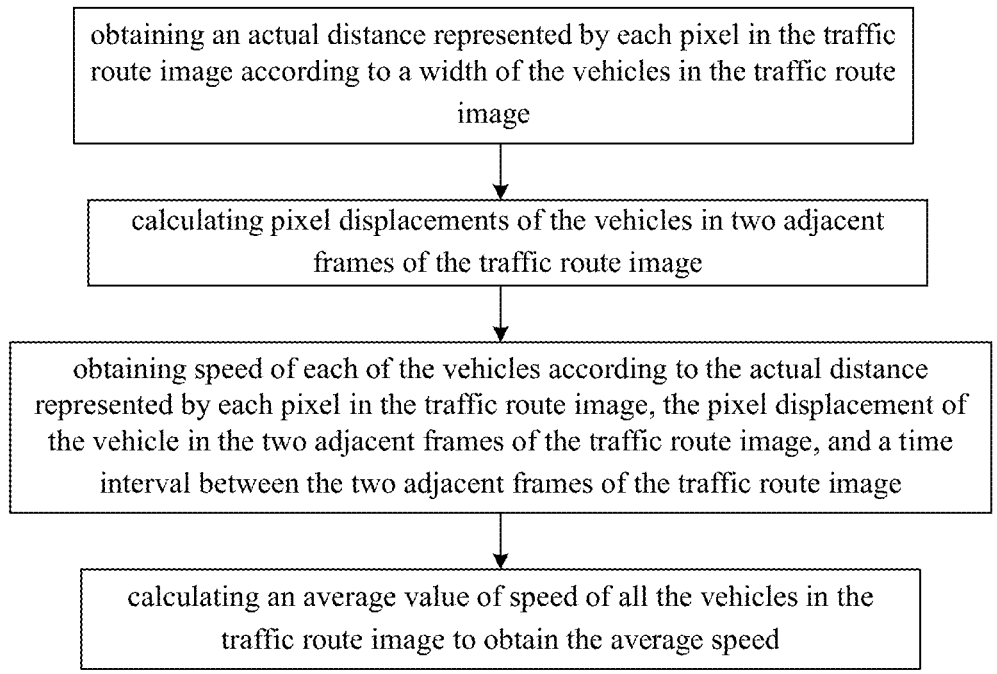
FIG. 10 is a schematic flow chart of calculating an average speed of vehicles performed by a traffic information processing equipment provided by at least one embodiment of the present disclosure.

FIG. 6 is a schematic working flow chart of a traffic information processing equipment provided by at least one embodiment of the present disclosure, FIG. 7 is a schematic flow chart of obtaining a position of an emergency lane performed by a traffic information processing equipment provided by at least one embodiment of the present disclosure, FIG. 8 is a schematic diagram of a straight line fitting performed by a traffic information processing equipment provided by at least one embodiment of the present disclosure, FIG. 9 is a schematic diagram of a traffic route image captured by a traffic information processing equipment provided by at least one embodiment of the present disclosure, and FIG. 10 is a schematic flow chart of calculating an average speed of vehicles performed by a traffic information processing equipment provided by at least one embodiment of the present disclosure. The working process of the traffic information processing equipment 10 is described below with reference to FIGS. 6-10.

As illustrated in FIG. 6, first, the image recognition and decision device 110 determines whether the scene is a highway based on whether the flying platform 130 flies above a highway at the time of acquiring the traffic route image.

In the case where the scene is the highway, the position of the emergency lane of the highway in the traffic route image is obtained. A vehicle detection is performed according to the position of the emergency lane in the traffic route image, and then, whether there is a vehicle in the emergency lane is determined. In the case where the vehicle is in the emergency lane, it is determined to perform the warning operation. In the case where there is no vehicle in the emergency lane, the monitoring is continued and the image acquisition device 140 is allowed to take the next shooting. The vehicle detection (the car detection) is described below in detail and is not repeated here.

For example, as illustrated in FIG. 7, the process of obtaining the position of the emergency lane of the highway in the traffic route image is described as follows. First, the gradient features of the traffic route image are extracted to obtain a gradient image. For example, in some examples, the filtering kernel can be [2, 2, 3, 0, −3, −2, −2], so the gradient features can be calculated as follows:

$$g\ \text{rad}(u,v) = \max(2*src[u-3,v]+2*src[u-2,v]+3*src[u-1,v]-3*src[u+1,v]-2*src[u+2,v]-2*src[u+3,v], 0),$$

wherein src[u, v] represents the pixel value on the coordinate (u, v) in the traffic route image, and grad(u, v) represents the gradient feature on the coordinate (u, v) in the traffic route image. After the above calculation is performed on all pixels in the traffic route image, the gradient image can be obtained. It should be noted that, in the embodiments of the present disclosure, the filtering kernel used for the gradient feature calculation is not limited to the above-mentioned value, but may also be other values, which may be determined according to actual needs, and is not limited by the embodiments of the present disclosure.

Then, the local threshold of each pixel in the gradient image is acquired. For example, in some examples, the local threshold of each pixel is the average value of pixel values within a window size of 32*1 centered on the current coordinate. Of course, the embodiments of the present disclosure are not limited thereto, the window size is not limited to 32*1, and other sizes may also be used, which may be determined according to actual needs. After the local threshold of each pixel is obtained, the binary image can be obtained by performing a binarization processing. For detailed descriptions of the binarization processing, reference can be made to the conventional design, which is not described in detail here.

Next, the cumulative sum of each column of white pixels in the binary image is calculated, and the peak position of the cumulative sum is obtained. Because the image acquisition device 140 for capturing the traffic route image is, for example, a down-view camera, the lane line obtained by the shooting is nearly vertical. After the binarization processing, the pixels of a suspected lane line are white pixels (white dots), and the rest are black pixels (background black dots). The number of white pixels in each column is counted. In the case where the cumulative sum of white pixels in a column is a peak in its neighborhood, a lane line may be considered to be in this column.

Then, straight line fitting in a neighborhood of the peak position of the cumulative sum in the binary image is performed. A plurality of straight lines that meet an angle requirement are selected, and the straight lines that do not meet the angle requirement are deleted. For example, the straight line with an angle between the vertical direction of equal to 0 degree, substantially equal to 0 degree, or within a certain angle range, is the straight line that meets the angle requirement. Next, the number of white pixels in a neighborhood of two straight lines that are adjacent and at an edge of the binary image among the plurality of straight lines is calculated, and whether the two straight lines are solid lines is determined according to the number of white pixels. In the case where the two straight lines are solid lines, the area between the two straight lines is determined as the position of the emergency lane.

For example, in some examples, the image obtained after performing straight line fitting on the binary image is illustrated in FIG. 8. Assuming u1, u2, u3, and u4 as the peak positions, the straight line fitting is performed by selecting a neighborhood with a width of Aw and centered on the peak position. For example, the least square method may be used for the straight line fitting, or any suitable method may be used, which is not limited in the embodiments of the present disclosure. After the candidate straight lines are obtained by fitting, because the lane lines are parallel and the angle relative to the vertical direction is close to 0 degree, the candidate straight lines that meet the angle requirement can be selected and the candidate straight lines that do not meet the angle requirement may be deleted. According to the conventional design of the highway, the emergency lane is usually on the far right. Therefore, the two adjacent straight lines on the far right of the multiple lines are selected, supposed to be u3 and u4. The number num of white pixels in the rectangular neighborhood of u3 and u4 (for example, the width of the rectangular neighborhood is 3 pixels) are calculated respectively. Assuming that the image height is h, the ratio k=num/h. In the case where k<th (th is the preset threshold), the straight line is considered to be a dotted lane line, otherwise it is a solid lane line. In the case where both u3 and u4 are solid lane lines, the area between u3 and u4 is considered to be the position of the emergency lane.

As illustrated in FIG. 6, in the case where the scene is not a highway, the vehicle detection is performed on the traffic route image. For example, in some examples, the schematic diagram of the captured traffic route image of non-highway is illustrated in FIG. 9. The vehicles (cars) in this image can be identified by performing the vehicle detection (that is, the car detection) on this image. For example, Adaboost algorithm or deep learning-based target detection algorithm, such as SSD, Faster-RCNN, Yolo and other algorithms may be used for the car detection, and these algorithms need to train the car detection model in advance. Of course, the embodiments of the present disclosure are not limited thereto, and any suitable algorithm may be used for the car detection, which may be determined according to actual needs.

As illustrated in FIG. 6, after the vehicle detection is performed, the number of the vehicles can be obtained, and it is determined whether the number of the vehicles in the traffic route image is greater than or equal to the threshold number. In the case where the number of the vehicles is less than the threshold number, it is considered that there may be no congestion, so as to continue to monitor and allow the image acquisition device 140 to take the next shot. In the case where the number of the vehicles is greater than or equal to the threshold number, it is considered that congestion may occur, so it is necessary to calculate the average speed of the vehicles. For example, the threshold number may be set in the traffic information processing equipment 10 in advance, or may be set or modified in real time. For example, the value of the threshold number may be determined according to actual needs, for example, according to the smoothness degree of the road that needs to be achieved, which is not limited in the embodiments of the present disclosure.

For example, in some examples, the process of calculating the average speed of the vehicles is illustrated in FIG. 10. First, the actual distance dd represented by each pixel in the traffic route image is obtained according to the width w of the vehicle in the traffic route image. For example, when performing the vehicle detection (car detection), the width w of all the vehicles (cars) in the traffic route image can be obtained. According to conventional experience, the width of a car is usually about 1.8 meters, so for each car, the actual distance, i.e., dd=1.8/w, of the real world represented by one pixel in the traffic route image can be obtained. For example, any car can be selected to calculate the actual distance dd and perform subsequent calculations, or the average value $\overline{dd}$ of the actual distances dd can be calculated according to all cars and the average value $\overline{dd}$ serves as the actual distance dd for subsequent calculations, which is not limited by the embodiments of the present disclosure.

Then the pixel displacement s of the vehicle in the two adjacent frames of the traffic route image is calculated. For example, a multi-target tracking algorithm is performed on each detected car, such as classic multi-target tracking algorithms, e.g., deep-sort, KCF, etc., so as to obtain the predicted position of each car in the next frame, and obtain the position of each car in the next frame combining with the next frame image. Assuming that the position of the ith car in the current frame is $(u_t^i, v_t^i)$ and the position of the ith car in the next frame is $(u_{t+1}^i, v_{t+1}^i)$, the pixel displacement of the ith car is $s=\sqrt{(u_{t+1}^i-u_t^i)^2+(v_{t+1}^i-v_t^i)^2}$.

Next, according to the actual distance dd (or $\overline{dd}$) represented by each pixel in the traffic route image, the pixel displacement s of the vehicle in the two adjacent frames of the traffic route image, and the time interval Δt between the two adjacent frames of the traffic route image, the speed of each vehicle is obtained. For example, the actual displacement of the ith car on the road is s1=s*dd (or s1=s*$\overline{dd}$). Because the time interval Δt between the two adjacent frames of the traffic route image can be determined, for example, may be the time difference between two frames of images captured by the image acquisition device 140, the speed of the ith car is $v_i$=s1/Δt.

Finally, the average speed of all vehicles in the traffic route image is calculated to obtain the average speed $v=(\Sigma_{i=1}^{i=N}v_i)/N$. N is the total number of the vehicles (cars).

It should be noted that in at least one embodiment of the present disclosure, when calculating the average speed of the vehicles, it is necessary to temporarily stop the position change of the flying platform 130 (for example, maintaining a hovering state), so that the image acquisition device 140 can capture at least two frames of traffic route images at a same position to improve the validity and accuracy of the calculation result.

As illustrated in FIG. 6, after calculating the average speed, whether the average speed is less than the threshold speed is determined. In the case where the average speed is less than the threshold speed, it is considered that the car is traveling slowly and there is a certain degree of congestion, so it is determined to perform a warning operation. In the case where the average speed is greater than or equal to the threshold speed, it is considered that there is no congestion, so monitoring is continued and the image acquisition device 140 is allowed to take a next shot.

For example, in some embodiments, the traffic information processing equipment 10 can also control the speed of the flying platform 130 to adjust the distance between the flying platform 130 and the target vehicle 20. In this case, the flying platform 130 has, for example, a speed-adjustable function.

Figure 11:
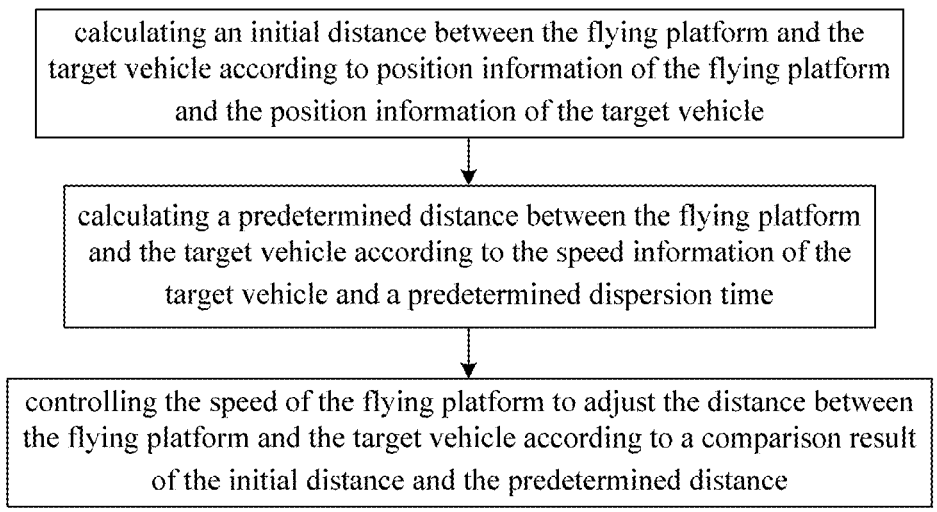
FIG. 11 is a schematic flow chart of adjusting a distance between a flying platform and a target vehicle by a traffic information processing equipment provided by at least one embodiment of the present disclosure.

FIG. 11 is a schematic flow chart of adjusting a distance between a flying platform and a target vehicle by a traffic information processing equipment provided by at least one embodiment of the present disclosure. As illustrated in FIG. 11, first, based on the position information of the flying platform 130 and the position information of the target vehicle 20, the initial distance Δs between the flying platform 130 and the target vehicle 20 is calculated. For example, the position information of the flying platform 130 may be acquired by the positioning device 150, and the position information of the target vehicle 20 may be transmitted to the communication device 160 by the target vehicle 20 through wireless communication.

Then, based on the speed information of the target vehicle 20 and a predetermined dispersion time t', the predetermined distance s' between the flying platform 130 and the target vehicle 20 is calculated. For example, the speed information of the target vehicle 20 may be transmitted to the communication device 160 by the target vehicle 20 through wireless communication. For example, the predetermined dispersion time t' of the traffic information processing equipment 10 indicates that it needs to disperse the vehicle in advance of time t', and for example, t' may be 1 minute or other suitable time, so the predetermined distance between the flying platform 130 and the target vehicle 20 is s'=t'*v1, wherein v1 represents the speed of the target vehicle 20.

Next, based on the comparison result of the initial distance Δs and the predetermined distance s', the speed of the flying platform 130 is controlled to adjust the distance between the flying platform 130 and the target vehicle 20. In the case where Δs>s', it means that the distance between the flying platform 130 and the target vehicle 20 is relatively far, and then the speed of the flying platform 130 is reduced, thereby shortening the distance between the two. In the case where Δs<s', it means that the distance between flying platform 130 and the target vehicle 20 is relatively close, and then the speed of the flying platform 130 is increased, thereby increasing the distance between the two. In the case where Δs=s', it means that the distance between the flying platform 130 and the target vehicle 20 is appropriate, and then the speed of the flying platform 130 remains unchanged, so that the distance between the two remains unchanged. After this calculation is completed, the next cycle calculation is performed. For example, the time interval between two calculations may be determined according to actual needs, e.g., taking into account both the hardware resource overhead of the calculation and the timeliness of adjusting the distance, which is not limited in the embodiments of the present disclosure.

For example, the above calculation process may be completed by the speed calculation device 170, and the speed calculation device 170 transmits the calculation result to the flight control device 132 of the flying platform 130, so that the speed of the flying platform 130 can be adjusted. In this way, the distance between the flying platform 130 and the target vehicle 20 can be kept within a suitable range, so that the dispersing effectiveness of the section can be ensured, so as to avoid affecting the traffic due to dispersion ahead of a too long time or obstructing the passage of the special vehicles due to untimely dispersion.

At least one embodiment of the present disclosure also provides a traffic information processing system. The traffic information processing system can provide dispersion and warning for vehicles in a traffic route (such as cars on a road), so as to help, for example, police cars, fire trucks, engineering rescue vehicles, ambulances and other special vehicles, to pass quickly, which has real-time capability and accuracy, and can ensure the dispersing effectiveness of the section, thereby avoiding affecting the traffic due to dispersion ahead of a too long time or obstructing the passage of the special vehicles due to untimely dispersion.

Figure 12:
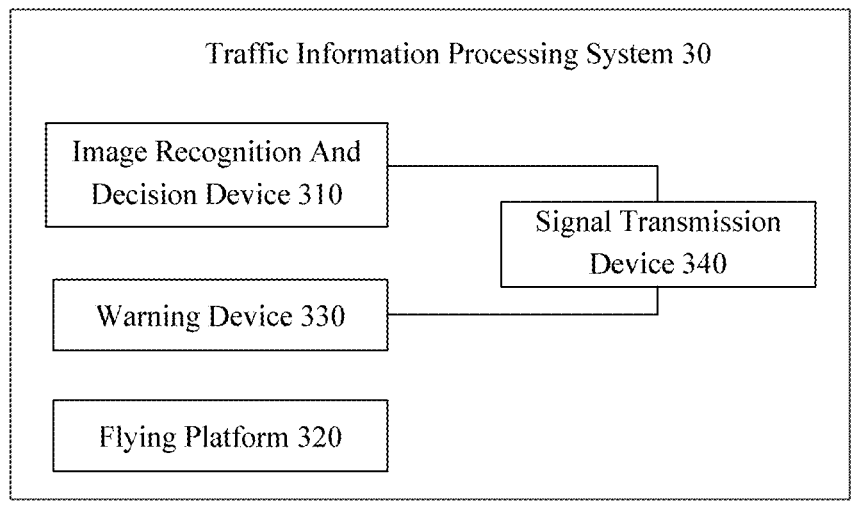
FIG. 12 is a schematic block diagram of a traffic information processing system provided by at least one embodiment of the present disclosure.

FIG. 12 is a schematic block diagram of a traffic information processing system provided by at least one embodiment of the present disclosure. As illustrated in FIG. 12, a traffic information processing system 30 comprises an image recognition and decision device 310, a flying platform 320, and a warning device 330. The flying platform 320 is configured to perform flying. The image recognition and decision device 310 is outside the flying platform 320, and is configured to process a received traffic route image to identify a scene, and determine whether to perform a warning operation according to the scene to obtain a determination result. The warning device 330 is on the flying platform 320, and is configured to generate warning information according to the determination result for sending prompt information to vehicles in a traffic route. For example, the functions and implementations of the image recognition and decision device 310, the flying platform 320, and the warning device 330 are basically the same as the aforementioned image recognition and decision device 110, the flying platform 130, and the warning device 120, which are not repeated here.

For example, the traffic information processing system 30 further comprises a signal transmission device 340. The signal transmission device 340 is provided outside the flying platform 320, and is configured to receive the traffic route image and transmit the determination result of the image recognition and decision device 310 to the warning device 330. The signal transmission device 340 may be various types of wireless communication devices, which is not limited in the embodiments of the present disclosure.

For example, the application scenario of the traffic information processing system 30 is basically similar to the application scenario illustrated in FIG. 5, except that the warning device 330 is installed on the flying platform 320 instead of in the service base station 180. For example, the image recognition and decision device 310 and the signal transmission device 340 are provided outside the flying platform 320, the image recognition and decision device 310 is, for example, provided in the service base station 180 illustrated in FIG. 5, and the signal transmission device 340 is, for example, the signal transmission device 190 illustrated in FIG. 5. For the detailed description, reference can be made to the foregoing content, which is not repeated here.

In this way, the image recognition and decision device 310 and the warning device 330 are respectively provided at the back end of the system (such as the ground control center) and the front end of the system (such as the flying platform 320 flying above the road), which is convenient for the staffs to coordinate and monitor comprehensively to simultaneously perform traffic dispersion for a plurality of target traffic vehicles 20, and also simplifies the structure and function of the warning device 330, enabling the warning device 330 to directly send prompt information to vehicles on the road.

At least one embodiment of the present disclosure also provides a method for processing traffic information. By using the method, guidance and warning can be provided for vehicles in a traffic route (such as cars on a road), so as to help, for example, police cars, fire trucks, engineering rescue vehicles, ambulances and other special vehicles, to pass quickly, which has real-time capability and accuracy, and can ensure the dispersing effectiveness of the section, so as to avoid affecting the traffic due to dispersion ahead of a too long time or obstructing the passage of the special vehicles due to untimely dispersion s.

Figure 13:
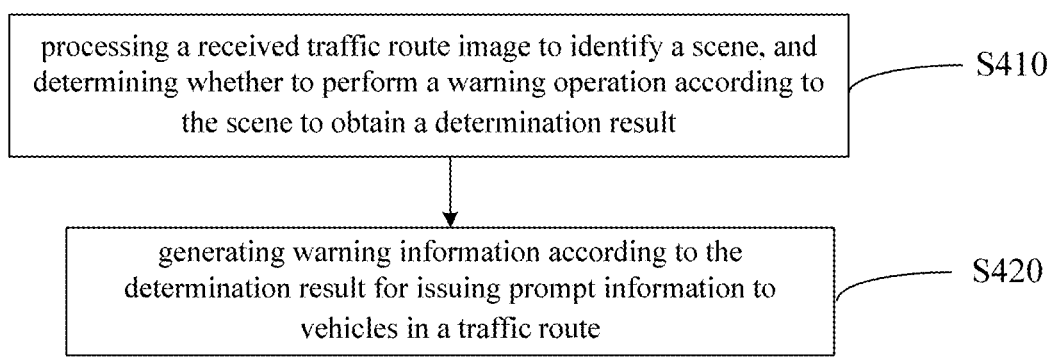
FIG. 13 is a schematic flow chart of a method for processing traffic information provided by at least one embodiment of the present disclosure.

FIG. 13 is a schematic flow chart of a method for processing traffic information provided by at least one embodiment of the present disclosure. For example, as illustrated in FIG. 13, the method for processing traffic information comprises following operations.

Step S410: processing a received traffic route image to identify a scene, and determining whether to perform a warning operation according to the scene to obtain a determination result; and Step S420: generating warning information according to the determination result for sending prompt information to vehicles in a traffic route.

For example, step S410 may be implemented by the aforementioned image recognition and decision device 110, and step S420 may be implemented by the aforementioned warning device 120. For the detailed description, reference may be made to the description of the image recognition and decision device 110 and the warning device 120 in the traffic information processing equipment 10, which is not repeated here.

For example, in step S410, the received traffic route image is processed to identify the scene, and whether the scene is a highway is determined to obtain a judgment result; the traffic route image is processed according to the judgment result, and whether the warning operation is performed is determined to obtain the determination result.

Figure 14:
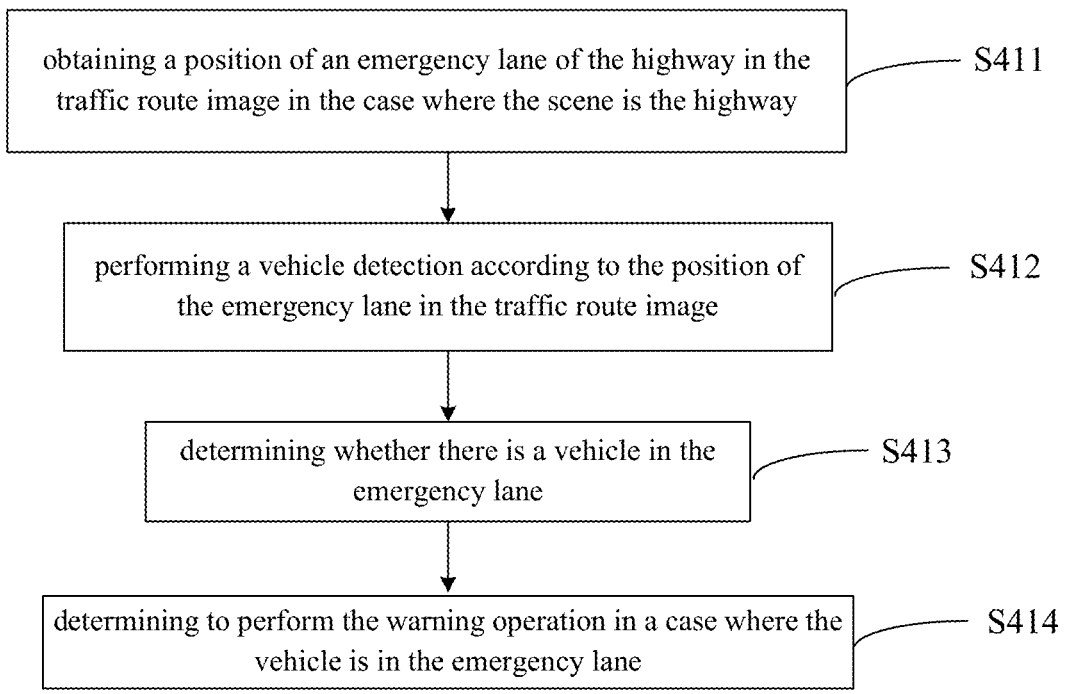
FIG. 14 is a schematic diagram of a specific process of step S410 in FIG. 13.

FIG. 14 is a schematic diagram of a specific process of step S410 in FIG. 13. For example, in some examples, as illustrated in FIG. 14, step S410 may comprise following operations.

Step S411: obtaining a position of an emergency lane of the highway in the traffic route image in the case where the scene is the highway;

Step S412: performing a vehicle detection according to the position of the emergency lane in the traffic route image;

Step S413: determining whether there is a vehicle in the emergency lane; and

Step S414: determining to perform the warning operation in the case where the vehicle is in the emergency lane.

For example, in step S411, first, the gradient features of the traffic route image are extracted to obtain a gradient image. Next, the local threshold of each pixel in the gradient image is acquired, and a binary image is further acquired. The cumulative sum of each column of white pixels in the binary image is calculated, and the peak position of the cumulative sum is obtained. And then, the straight line fitting is performed in a neighborhood of the peak position of the cumulative sum in the binary image. A plurality of straight lines that meet an angle requirement are selected. The number of white pixels in a neighborhood of two straight lines that are adjacent and at an edge of the binary image among the plurality of straight lines is calculated. Whether the two straight lines are solid lines is determined according to the number of the white pixels. In the case where the two straight lines are the solid lines, the area between the two straight lines is determined to be the position of the emergency lane.

Figure 15:
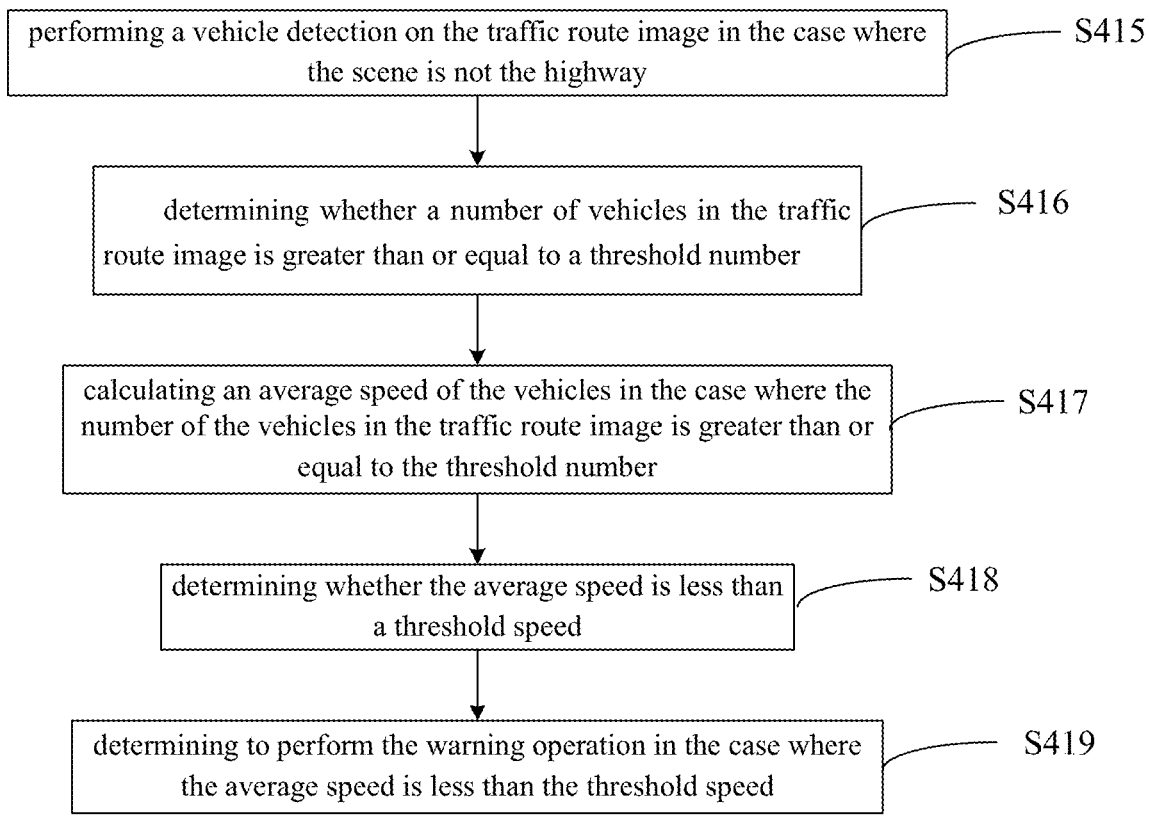
FIG. 15 is another schematic diagram of a specific process of step S410 in FIG. 13.

FIG. 15 is another schematic diagram of another specific process of step S410 in FIG. 13. For example, in some examples, as illustrated in FIG. 15, step S410 may comprise following operations.

Step S415: performing a vehicle detection on the traffic route image in the case where the scene is not the highway;

Step S416: determining whether a number of vehicles in the traffic route image is greater than or equal to a threshold number;

Step S417: calculating an average speed of the vehicles in the case where the number of the vehicles in the traffic route image is greater than or equal to the threshold number;

Step S418: determining whether the average speed is less than a threshold speed; and Step S419: determining to perform the warning operation in the case where the average speed is less than the threshold speed.

For example, in step S417, first, the actual distance represented by each pixel in the traffic route image is obtained according to the width of the vehicle in the traffic route image. Next, the pixel displacement of the vehicle in two adjacent frames of the traffic route image is calculated. According to the actual distance represented by each pixel in the traffic route image, the pixel displacement of the vehicle in the two adjacent frames of the traffic route image, and a time interval between the two adjacent frames of the traffic route image, the speed of each of the vehicles is obtained. And then, the average value of speeds of all the vehicles in the traffic route image is calculated to obtain the average speed.

Figure 16:
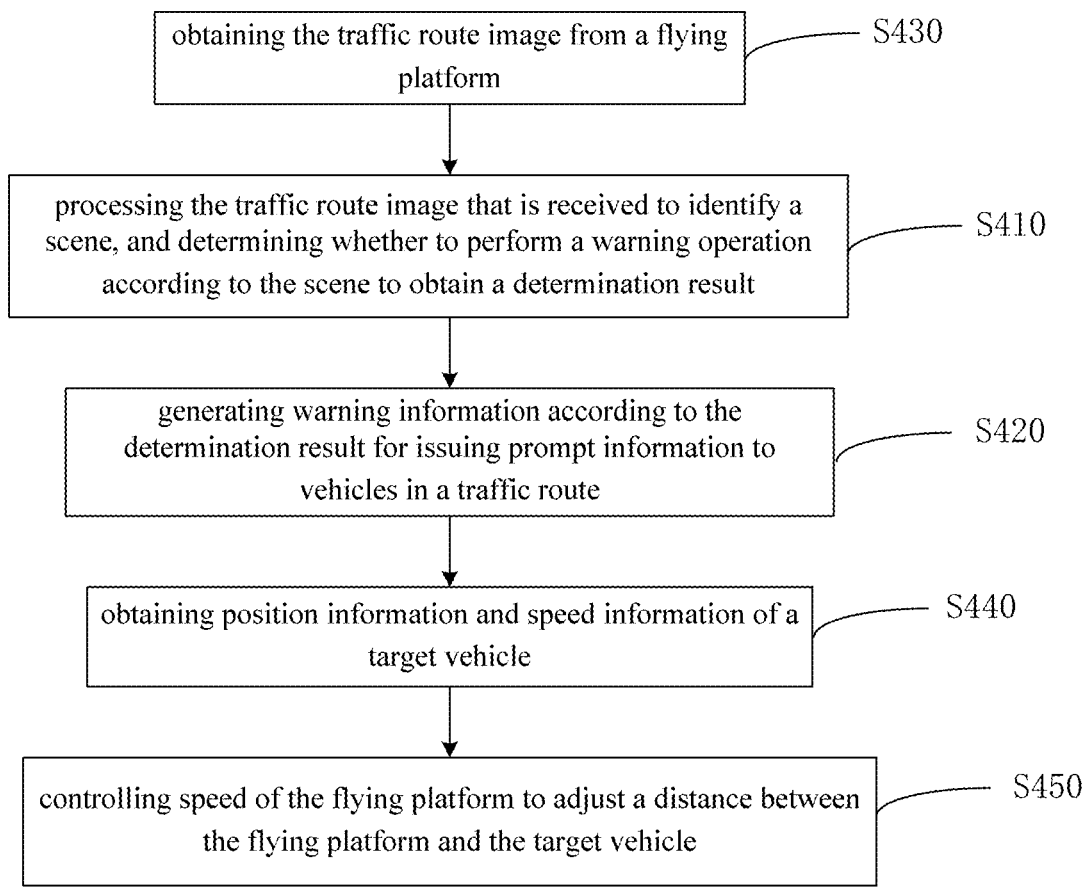
FIG. 16 is a schematic flow chart of another method for processing traffic information provided by at least one embodiment of the present disclosure.

FIG. 16 is a schematic flow chart of another method for processing traffic information provided by at least one embodiment of the present disclosure. For example, as illustrated in FIG. 16, the method for processing traffic information in this embodiment is basically the same as the method for processing traffic information illustrated in FIG. 13, except that steps S430, S440, and S450 are also included.

Step S430: obtaining the traffic route image from a flying platform;

Step S440: obtaining position information and speed information of a target vehicle; and Step S450: controlling speed of the flying platform to adjust a distance between the flying platform and the target vehicle.

For example, in step S450, first, the initial distance between the flying platform and the target vehicle is calculated according to the position information of the flying platform and the position information of the target vehicle. Next, a predetermined distance between the flying platform and the target vehicle is calculated according to the speed information of the target vehicle and a predetermined dispersion time. And then, according to the comparison result of the initial distance and the predetermined distance, the speed of the flying platform is controlled to adjust the distance between the flying platform and the target vehicle.

It should be noted that in some embodiments of the present disclosure, the method for processing traffic information may further include more or fewer steps, and the execution order of each step is not limited to the order described above, which may be determined according to actual needs. The embodiments of the present disclosure do not limit this. For the detailed description and the technical effects of each step of the method for processing traffic information, reference may be made to the above description of the traffic information processing equipment 10, and details are not described here.

The following statements should be noted.

(1) The accompanying drawings involve only the structure(s) in connection with the embodiment(s) of the present disclosure, and other structure(s) can be referred to common design(s).

(2) In case of no conflict, features in one embodiment or in different embodiments can be combined to obtain new embodiments.

What have been described above are only specific implementations of the present disclosure, the protection scope of the present disclosure is not limited thereto, and the protection scope of the present disclosure should be based on the protection scope of the claims.

What is claimed is:

1. A traffic information processing equipment, comprising:
an image recognition and decision device, configured to process a traffic route image, which is received, to identify a scene, and determine whether to perform a warning operation according to the scene to obtain a determination result; and a warning device, configured to generate warning information according to the determination result for sending prompt information to a vehicle in a traffic route, a flying platform, configured to perform flying; and an image acquisition device on the flying platform, configured to acquire the traffic route image, wherein the image recognition and decision device and the warning device are both on the flying platform;

processing the traffic route image, which is received, to identify the scene and determining whether to perform the warning operation according to the scene to obtain the determination result comprises:

determining whether the scene is a highway, according to whether the flying platform flies above the highway while acquiring the traffic route image;

performing, in a case where the scene is not a highway, a vehicle detection on the traffic route image;

determining whether a number of vehicles in the traffic route image is greater than or equal to a threshold number;

calculating an average speed of the vehicles, in a case where the number of the vehicles in the traffic route image is greater than or equal to the threshold number;

determining whether the average speed is less than a threshold speed; and determining to perform the warning operation in a case where the average speed is less than the threshold speed.

2. The traffic information processing equipment according to claim 1, further comprising a positioning device, wherein the positioning device is on the flying platform and is configured to obtain position information of the flying platform.

3. The traffic information processing equipment according to claim 1, further comprising:

a communication device on the flying platform, configured to communicate with a target vehicle to obtain position information and speed information of the target vehicle; and a speed calculation device on the flying platform, configured to adjust a distance between the flying platform and the target vehicle by controlling a speed of the flying platform.

4. The traffic information processing equipment according to claim 3, wherein the target vehicle comprises a police car, a fire truck, an engineering rescue vehicle, or an ambulance.

5. The traffic information processing equipment according to claim 1, wherein processing the traffic route image, which is received, to identify the scene and determining whether to perform the warning operation according to the scene to obtain the determination result further comprises:

obtaining, in a case where the scene is a highway, a position of an emergency lane of the highway in the traffic route image;

performing a vehicle detection according to the position of the emergency lane in the traffic route image;

determining whether there is a vehicle in the emergency lane; and determining to perform the warning operation in a case where the vehicle is in the emergency lane.

6. The traffic information processing equipment according to claim 1, wherein the flying platform comprises:

an airframe;

a flight control device, configured to control a flying status of the flying platform;

a data link device, configured to transmit a remote control instruction and feedback data;

a launch recovery device, configured to control a take-off process and a landing process of the flying platform; and a power supply, configured to provide electrical energy, wherein the flight control device, the data link device, the launch recovery device, and the power supply are all on the airframe.

7. The traffic information processing equipment according to claim 1, wherein the warning device comprises a loudspeaker, an alarm bell or a cell broadcast system.

8. The traffic information processing equipment according to claim 1, further comprising a signal transmission device, wherein the signal transmission device is configured to receive the traffic route image.

9. A method for processing traffic information, comprising:

processing a traffic route image, which is received, to identify a scene, and determining whether to perform a warning operation according to the scene to obtain a determination result; and generating warning information according to the determination result for sending prompt information to a vehicle in the traffic route, wherein processing the traffic route image, which is received, to identify the scene and determining whether to perform the warning operation according to the scene to obtain the determination result comprises:

determining whether the scene is a highway to obtain a judgment result, processing the traffic route image according to the judgment result, and determining whether to perform the warning operation to obtain the determination result.

10. The method according to claim 9, wherein determining whether the scene is a highway to obtain the judgment result, processing the traffic route image according to the judgment result, and determining whether to perform the warning operation to obtain the determination result comprises:

obtaining, in a case where the scene is a highway, a position of an emergency lane of the highway in the traffic route image;

performing a vehicle detection according to the position of the emergency lane in the traffic route image;

determining whether there is a vehicle in the emergency lane; and determining to perform the warning operation in a case where the vehicle is in the emergency lane.

11. The method according to claim 10, wherein obtaining the position of the emergency lane of the highway in the traffic route image comprises:

extracting gradient features of the traffic route image to obtain a gradient image;

acquiring a local threshold of each pixel in the gradient image;

acquiring a binary image;

calculating a cumulative sum of each column of white pixels in the binary image;

obtaining a peak position of the cumulative sum;

performing straight line fitting in a neighborhood of the peak position of the cumulative sum in the binary image;

selecting a plurality of straight lines that meet an angle requirement;

calculating a number of white pixels in a neighborhood of two straight lines that are adjacent and at an edge of the binary image among the plurality of straight lines;

determining whether the two straight lines are solid lines according to the number of the white pixels; and determining that an area between the two straight lines is the position of the emergency lane in a case where the two straight lines are the solid lines.

12. The method according to claim 9, wherein determining whether the scene is a highway to obtain the judgment result, processing the traffic route image according to the judgment result, and determining whether to perform the warning operation to obtain the determination result comprises:

performing a vehicle detection on the traffic route image in a case where the scene is not a highway;

determining whether a number of vehicles in the traffic route image is greater than or equal to a threshold number;

in a case where the number of the vehicles in the traffic route image is greater than or equal to the threshold number, calculating an average speed of the vehicles;

determining whether the average speed is less than a threshold speed; and determining to perform the warning operation in a case where the average speed is less than the threshold speed.

13. The method according to claim 12, wherein calculating the average speed of the vehicles comprises:

obtaining an actual distance represented by each pixel in the traffic route image according to a width of each of the vehicles in the traffic route image;

calculating a pixel displacement of each of the vehicles in two adjacent frames of the traffic route image;

obtaining a speed of each of the vehicles according to the actual distance represented by each pixel in the traffic route image, the pixel displacement of each of the vehicles in the two adjacent frames of the traffic route image, and a time interval between the two adjacent frames of the traffic route image; and calculating an average value of speeds of all the vehicles in the traffic route image to obtain the average speed.

14. The method according to claim 9, further comprising:

obtaining the traffic route image from a flying platform;

obtaining position information and speed information of a target vehicle;

controlling a speed of a flying platform to adjust a distance between the flying platform and the target vehicle, wherein controlling the speed of the flying platform to adjust the distance between the flying platform and the target vehicle comprises:

calculating an initial distance between the flying platform and the target vehicle according to position information of the flying platform and the position information of the target vehicle;

calculating a predetermined distance between the flying platform and the target vehicle according to the speed information of the target vehicle and a predetermined dispersion time; and controlling the speed of the flying platform to adjust the distance between the flying platform and the target vehicle according to a comparison result of the initial distance and the predetermined distance.

* * * * *